July 13, 1965 W. R. PRICE 3,194,260
HYDRAULIC UNLOADING VALVES
Filed July 13, 1962
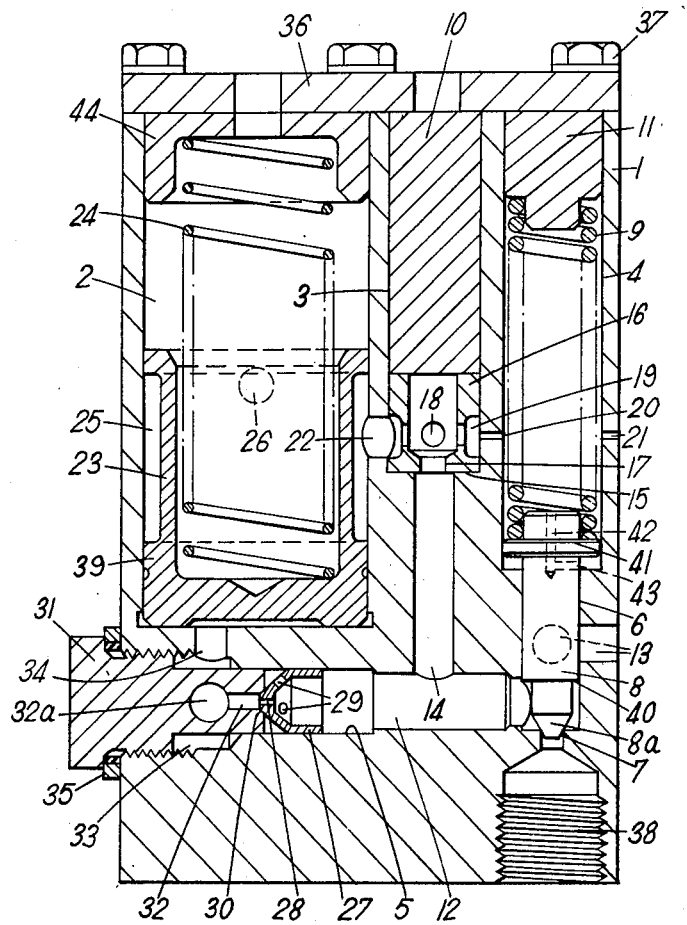
WILLIAM R. PRICE
Inventor
By P. F. Hilders
Attorney United States Patent Office 3,194,260
Patented July 13, 1965

3,194,260
HYDRAULIC UNLOADING VALVES
William R. Price, Hornchurch, England, assignor to
Ford Motor Company, Dearborn, Mich.
Filed July 13, 1962, Ser. No. 209,606
4 Claims. (Cl. 137—469)

This invention relates to hydraulic unloading valves, particularly for use in power lift systems or hydrostatic transmissions of tractors, and to lift or transmission systems incorporating the valves.

In the majority of tractor hydraulic systems, a simple relief valve is used, mainly because its construction is simple and cheap and also because it allows the sustained power which is necessary for lifting heavy implements or the high tear-away effort sometimes required by loader operations.

Used in systems where the control gear has an automatic return to neutral, a relief valve provides an ideal arrangement. Thus, an operator can hold the control lever in the lift position until the load has been lifted successfully, that is if it is at all within the lifting potential of the hydraulic system. It may well be that if the load encountered is a heavy one, that for a period until the mass has been accelerated, the relief valve will blow, but it will be only for a short duration (in fact, the matter of a second or two). On the load being lifted, the operator will relinquish the lever and the system will return to neutral. Then, if a stroke-limiting device is being used, there will be no danger of the relief valve being allowed to blow for any considerable time.

There are, however, tractor hydraulic systems, particularly of certain well known draft control types where the control lever does not automatically return to neutral, thus if the lever were inadvertently left in the lift position and a relief valve were used, oil would be pumped continuously through this valve, causing it to overheat. This, in turn, would have a detrimental effect on the hydraulic pump and other components.

It has, therefore, been found necessary with certain of these draft control systems to fit an unloading valve instead of a relief valve.

The term "unloading valve" in this context is used to describe a safety valve sometimes very similar in construction to a relief valve but with the exception that once the valve blows, it passes oil through a secondary stage at a very much lower pressure and thus "unloads" the system.

A typical unloading valve is one in which the valve itself in effect consists of two diameters. The first diameter is usually the diameter formed by the conical end of the valve located in a valve seat and the second diameter is much larger, but an integral part of the valve. In operation, the cone is lifted from its seat as soon as the maximum system pressure is reached, and the fluid then reacts against the second and larger diameter and lifts the valve instantaneously a slight distance until another set of holes is uncovered to relieve the fluid. Since the same spring pressure is applied against the larger diameter as the conical diameter, it will require less unit pressure to deflect the valve and, consequently, the pressure drops immediately, and in effect the system is unloaded.

While this gives full protection to the pump and other components, it has a serious disadvantage inasmuch as it often blows prematurely due to high inertia forces when lifting a heavy load; it, therefore, follows that it cannot "hang on" and sustain a high tear-away effort which is such a great advantage in a number of operations.

In hydrostatic transmissions, it is well known that high torques and consequent high pressures are encountered both during an operation and when starting, particularly when a heavy implement is being used. Here again a straight relief valve or unloading valve has the disadvantages previously mentioned.

The invention consists in an unloading valve comprising means for delaying the transition to the secondary, low-pressure stage after initial blowing of the valve. The delay need only be of the order of 5 to 10 seconds to provide the necessary load-sustaining properties, so that the ill effects of continual pumping of high-pressure oil through the valve would not be met.

Preferably, a restricted first stage relief passage communicates via a metering orifice with a chamber containing a piston which is progressively moved by fluid passing through the metering orifice towards a position where it blocks the said first stage relief passage.

At this stage, the pressure in the relief passage downstream of the relief valve rises abruptly to cause the second stage operation, i.e. unloading.

Preferably, the operation of the valve is damped to increase stability.

The invention further consists in a hydraulic lift system incorporating an unloading valve as described above.

The invention still further consists in a hydrostatic transmission incorporating an unloading valve as described above.

My invention is clearly defined in the appended claims. In the claims, as well as in the description, parts may at times be identified by specific names for clarity and convenience, but such nomenclature is to be understood as having the broadest meaning consistent with the context and with the concept of my invention as distinguished from the pertinent prior art. The best form in which I have contemplated applying my invention is illustrated in section in the accompanying drawing forming part of this specification.

Referring to the drawing, the valve mechanism illustrated is carried in a body 1 which has machined in it four bores 2, 3, 4 and 5. Bore 4 is extended into a bore 6, the end of which is formed with or carries a valve seat 7. A two-diameter valve 8 having one diameter formed with a conical end 8a slides in bore 6 and is urged towards the valve seat 7 by the pressure of a spring 9. A packing piece 11 gives the correct pre-set loading to spring 9. Leading off at right angles from bore 6 is a drilling 12 and at a predetermined distance are a set of exhaust drillings 13. Bore 4 is connected to exhaust by an aperture 21.

A drilling 14 connects bore 3 with the drilling 12 and a sleeve 16 is located against a shoulder 15 formed at the junction of drilling 14 with bore 3 by a spacer 10. Sleeve 16 is formed with a restricting orifice 17, drillings 18 and an annular groove 19. Bore 3 is connected to bore 4 by a small drilling 20 and to bore 2 by a larger drilling 22.

Sliding in bore 2 is a piston 23 downwardly urged by a light spring 24. An annular chamber 25 is formed by piston 23 in the bore 2 allowing communication between drilling 22 and an exhaust outlet 26. To limit the upward movement of piston 23, bore 2 is provided with a stop 44.

Received in bore 5, which is an enlarged extension of drilling 12, is a one-way restrictor valve 27 which carries a metering orifice 28 and drillings 29 and in turn is located against a valve seat 30 formed on a plug 31.

Bore 5 is in communication with bore 2 below the piston 23 through the metering orifice 28, drillings 32 and 32a, an annulus 33 and a drilling 34. The plug 31 is sealed in the bore 5 by a gasket 35.

Components in bores 2, 3 and 4 are retained by a plate 36 secured by bolts 37 to the body 1. A connection from the system to be relieved is connected to port 38 and the whole valve assembly is supported by a bracket or other means in the sump or tank of the hydraulic system.

The operation of this valve is as follows:

When excess pressure builds up on the output side of the pump, due, for instance, to the ram reaching the end of its stroke, valve 8 blows and allows oil to pass across seat 7 and exhaust itself through drillings 12 and 14, orifice 17, drillings 18, annular groove 19, drilling 22, annular chamber 25 and drilling 26 to the sump. The restriction created by orifice 17 generates a back pressure in bore 5 so that a small percentage of the exhausted fluid is metered through orifice 28. This, in turn, finds its way to the underside of piston 23 through drillings 32 and 32a, annulus 33 and drilling 34 with the result that piston 23 gradually rises against the resistance of spring 24 and the gravity effect of its own weight.

It will be observed that in the meantime the valve has been behaving as a straight forward relief valve and blowing off at the normal system pressure, so that a maximum tear-away effort may be provided and sustained. In due course, however, piston 23 will have lifted sufficiently for a land 39 on piston 23 to cover drilling 22. Since all escape for the total output of the pump is then closed except for a very small amount metered through drillings 20 and 21, pressure will build up inside bore 6 and lift valve 8 until the land 40 on the valve 8 uncovers exhaust drillings 13. Since the pressure of the fluid is now working against the diameter of the land 40 and not the diameter equivalent to the valve seat 7, the pressure will drop to a value depending on the proportion of the two areas and in effect the pump will be unloaded.

When the system is returned to neutral to relieve the pressure, the valve 8 will reseat itself and fluid locked in the piston chamber will exhaust itself slowly at first through the holes 29 of the one-way restrictor valve 27 and the small drillings 20 and 21 and, as piston 23 descends and land 39 uncovers drilling 22, its speed will increase since the oil will then be able to exhaust itself through orifice 17 and the drillings 18, 22 and 26.

It has been found in practice that this type of valve can be very unstable, but, by introducing effective damping arrangements, this can largely be eliminated. For this purpose a collar 41 is formed at the top of the valve 8 to give a close sliding fit in bore 4 and small drillings 42 and 43 are used to communicate pressure to the underside of the collar 41. Fluid is supplied under pressure through the small drilling 20 and exhausted through the drilling 21. This fluid keeps the chamber above collar 41 filled so that the passages 42, 43 act to damp movement of the valve 8.

Various modifications may be made within the scope of the invention.

I claim:

1. A time delay unloading valve, comprising a valve body having a first bore and a valve seat, a valve member slidingly received within the bore, a spring for urging the valve member into closed position against the seat, a pressure relief passage intersecting the first bore and uncovered by movement of the valve member away from the valve seat, a second bore in the valve body, a piston within the second bore, a fluid inlet at one end of the second bore, means for restricting fluid flow through the fluid inlet, a passage connecting the second bore with the first bore adjacent the valve seat, a spring urging the piston towards the fluid inlet end of the second bore, a fluid inlet passage connecting the first bore adjacent the valve seat with the second bore intermediate its length, a fluid outlet in the second bore communicating with the inlet intermediate the length of the second bore when the piston is at the fluid inlet end of the bore and blocked by movement of the piston against its bias, whereby excess pressure against the valve member will raise the valve from its seat, fluid entering the valve in part being released through the second bore and in part entering the second bore through the fluid inlet at the end thereof and raising the piston over an appreciable interval of time until the fluid inlet intermediate the second bore is blocked, whereupon the resulting rise in pressure in the first bore will raise the valve member sufficiently to uncover the pressure relief passage.

2. A time delay unloading valve, comprising a valve body having a first bore and a valve seat, a valve member slidingly received within the bore, a spring for urging the valve member into closed position against the seat, a pressure relief passage intersecting the first bore and uncovered by movement of the valve member away from the valve seat, a second bore in the valve body, a piston within the second bore, a fluid inlet at one end of the second bore, a passage connecting the second bore with the first bore adjacent the valve seat and having a fluid metering orifice therein, a spring urging the piston towards the fluid inlet end of the second bore, a fluid inlet passage connecting the first bore adjacent the valve seat with the second bore intermediate its length, a fluid outlet in the second bore communicating with the inlet intermediate the length of the second bore when the piston is at the fluid inlet end of the bore and blocked by movement of the piston against its bias, whereby excess pressure against the valve member will raise the valve from its seat, fluid entering the valve in part being released through the second bore and in part entering the second bore through the metering orifice and raising the piston over an appreciable interval of time until the fluid inlet intermediate the second bore is blocked, whereupon the resulting rise in pressure in the first bore will raise the valve member sufficiently to uncover the pressure relief passage.

3. An unloading valve as claimed in claim 2, in which the fluid-metering orifice is formed in a one-way restrictor valve so that reverse flow to empty the second bore is expedited.

4. An unloading valve as claimed in claim 3, in which the cross-sectional area of the first bore is substantially larger than the area within the valve seat.

References Cited by the Examiner

UNITED STATES PATENTS 2,290,080   7/42   Wahlmark  137—116
2,391,790   12/45  Martinsson  137—116

ISADOR WEIL, *Primary Examiner.*

WILLIAM F. O'DEA, *Examiner.*